(12) United States Patent
Lipsa

(10) Patent No.: US 8,678,059 B2
(45) Date of Patent: Mar. 25, 2014

(54) MODIFIABLE ELEMENT FOR SHAPING A RAW TIRE BLANK

(75) Inventor: Andrei Lipsa, Aubiere (FR)

(73) Assignees: Compagnie General des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 76 days.

(21) Appl. No.: 13/140,417

(22) PCT Filed: Dec. 11, 2009

(86) PCT No.: PCT/FR2009/052501
§ 371 (c)(1),
(2), (4) Date: Sep. 20, 2011

(87) PCT Pub. No.: WO2010/076462
PCT Pub. Date: Jul. 8, 2010

(65) Prior Publication Data
US 2011/0315323 A1    Dec. 29, 2011

(30) Foreign Application Priority Data
Dec. 16, 2008   (FR) ...................... 0858654

(51) Int. Cl.
B29D 30/24 (2006.01)
(52) U.S. Cl.
USPC ............. 156/414; 156/133; 156/417

(58) Field of Classification Search
USPC ......... 156/414, 416, 417, 418, 419, 420, 133; 492/38
See application file for complete search history.

(56) References Cited

U.S. PATENT DOCUMENTS

| 1,577,664 A | 3/1926 | Tew |
| 3,607,558 A | 9/1971 | Nebout |
| 4,052,246 A * | 10/1977 | Albareda et al. ............... 156/412 |
| 6,079,661 A * | 6/2000 | Klimek et al. ................. 242/551 |
| 2007/0095481 A1 | 5/2007 | Graaf et al. |

FOREIGN PATENT DOCUMENTS

| GB | 2 223 988 | 4/1990 |
| JP | 2007-185888 | 7/2007 |
| JP | 2007 185888 | 7/2007 |
| JP | 2007-152574 | * 8/2007 ............ B29D 30/24 |

OTHER PUBLICATIONS

French Preliminary Search Report. Application No. FR 0858654, report dated Jul. 20, 2009.

* cited by examiner

*Primary Examiner* — Martin Rogers
(74) *Attorney, Agent, or Firm* — Cozen O'Connor

(57) ABSTRACT

The element (12) for shaping a circumferential portion of a raw tire blank substantially exhibiting symmetry of revolution about a main axis (X) comprises a bearing surface (16) for bearing radially against a circumferential portion of a radially internal surface of the blank. The element (16) is designed in such a way that the radial profile of the bearing surface (16) is modifiable.

5 Claims, 2 Drawing Sheets

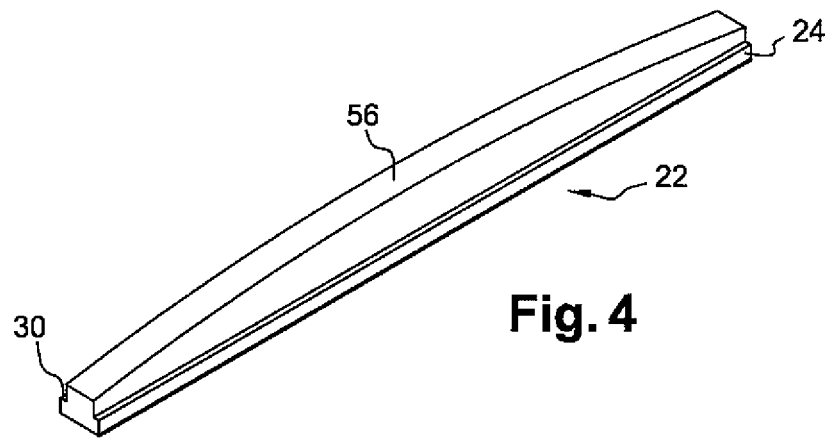
Fig. 4
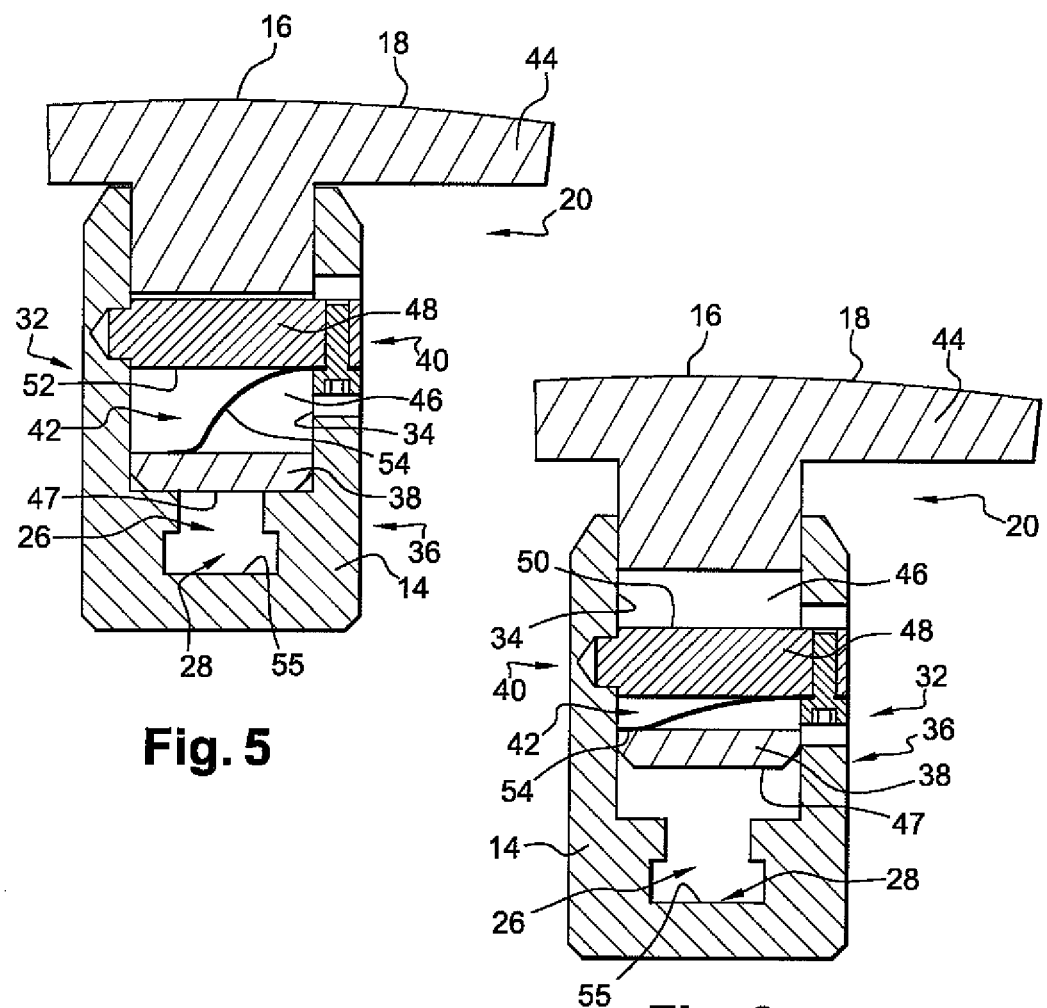
Fig. 5
Fig. 6

MODIFIABLE ELEMENT FOR SHAPING A RAW TIRE BLANK

RELATED APPLICATIONS

This is a U.S. National Phase under 35 U.S.C. §371 of International Application No. PCT/FR2009/052501, filed on Dec. 11, 2009, and claims priority on French patent Application No. 08/58654, filed on Dec. 16, 2008, the entire content of which is hereby incorporated by reference.

FIELD OF THE INVENTION

The present invention relates to the technical field of tires.

BACKGROUND OF THE INVENTION

In what follows the axis of revolution of a raw blank will be called its axis. This axis defines an axial direction of the blank and of the device for shaping the blank when considering the blank in position on the device.

A raw tire blank or green tire is generally formed of a carcass on which a crown assembly intended to form the tread is positioned. The carcass and the crown assembly are formed of unvulcanized rubber profiled elements some of which contain reinforcing threads.

When the blank is vulcanized in a mould, a variation in the relative positioning of the carcass and of the crown assembly is observed. The final relative position of the carcass and of the crown assembly is dictated by the mould, and is therefore known. The variation in the relative positioning allows certain geometric features of the vulcanized tire to be modified. Thus, these geometric features can be controlled by modifying the initial relative position of the carcass and of the crown assembly, the final relative position and the variation in relative positioning also being known.

The tire crown assembly blank comprises crown reinforcing plies formed of reinforcing threads coated in rubber, which are parallel to one another and make a given angle with the circumferential direction of the tire, the tread, and a certain number of rubber profiled elements which are intended to reinforce the axial ends of the reinforcing plies.

The raw blank of the crown assembly is formed on a blank shaping device. This device comprises a plurality of elements for shaping a circumferential portion of the tire crown blank. Each element comprises a bearing surface for bearing radially against a circumferential portion of the radially internal surface of the blank. Each bearing surface is carried by a support that positions the element with respect to the blank.

In order to modify the initial relative position and therefore the geometric features of the tire, the bearing surface of the device exhibits, in a radial plane, for given geometric features, a given profile that determines the initial relative position. In order to obtain a wide variety of geometric features, it is necessary to have a wide variety of profiles for the bearing surfaces of the elements of the device.

Now, changing the elements in order to build different types of tire that have different geometric features is time-consuming. In addition, these elements are relatively expensive.

SUMMARY OF THE INVENTION

It is an object of the invention to provide a device that allows various types of tires having different geometric features to be obtained easily.

To this end, one aspect of the invention is directed to an element for shaping a circumferential portion of a raw tire blank that substantially exhibits symmetry of revolution about a main axis, comprising a bearing surface for bearing radially against a circumferential portion of a radially internal surface of the blank, the element being designed in such a way that the radial profile of the bearing surface is modifiable, and comprising:

- a support and several movable members that can move radially with respect to the support independently of one another and which are axially juxtaposed, each movable member having a partial bearing surface, the full set of partial bearing surfaces forming the bearing surface of the element, and
- positioning means for radially positioning the members with respect to the support comprising a packing piece intended to be inserted between the base surface of the support and the actuating surfaces of the movable members, the radial profile of the packing piece defining the radial profile of the bearing surface of the element.

The element according to the invention makes it possible to obtain a wide variety of tires having different geometric features. Specifically, because the radial profile of the bearing surface is modifiable, this surface can be modified at will. Thus, the initial relative position of the carcass and of the crown element is easily modifiable, notably by moving the bearing surface radially, to suit the geometric performance features desired of the tire.

Each partial bearing surface allows an axial portion of the circumferential portion of the blank to be forced into an initial relative position that differs from the initial relative position of another axial portion of the circumferential portion of the blank. Thus, the variation in relative positioning can be modified axially on the circumferential portion of the blank, and this makes it possible to obtain performance properties that differ in the axial direction.

The packing piece allows the radial profile of the bearing surface to be changed easily. Specifically, because the radial profile of the packing piece in the radial plane is substantially analogous to the radial profile for the bearing surface in this radial plane, all that is required is a different packing piece for each type of radial profile desired. Because such a packing piece is easy to manufacture, various types of tires having different geometric features can easily be obtained using one and the same support, and by changing only the packing piece.

According to one optional feature of the element according to the invention, the base surface extends axially and each actuating surface is on the opposite side to the partial bearing surface and faces the base surface, the distance between the base surface and the actuating surface of each movable member being variable as a function of the radial position of the movable member with respect to the support.

According to other optional features of the element according to embodiments of the invention:

- The support comprises means of axially guiding the packing piece comprising a female slide in which the packing piece that forms a male slide can be slidably mounted.
- The element comprises means of radially guiding each movable member with respect to the support.
- The element comprises means of limiting the radial travel of each movable member.
- The element comprises means for elastically returning each movable member.

Another aspect of the invention is directed to a device for shaping a raw tire blank, the device substantially exhibiting symmetry of revolution about a main axis, comprising several elements as described hereinabove distributed circumferentially about the main axis.

BRIEF DESCRIPTION OF THE DRAWINGS

The invention will be better understood from reading the description which will follow, which is given solely by way of nonlimiting example and with reference to the drawings in which:

FIG. 4 is a perspective view of a packing piece of the element of FIG. 2;

FIG. 5 is a view in cross section of a movable member of the element of FIG. 2 in a rest position;

FIG. 6 is a view in cross section of the member of FIG. 2 in an actuating position.

DETAILED DESCRIPTION OF THE DRAWINGS

Figure 1:
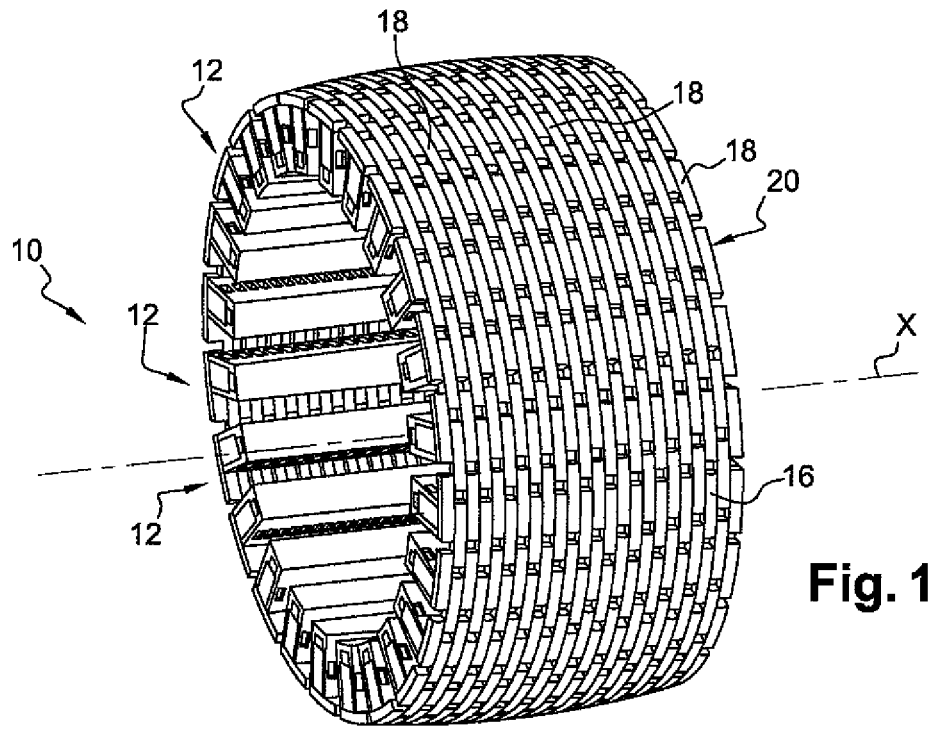
FIG. 1 is a perspective view of a device according to an embodiment of the invention for shaping a raw tire blank.
Figure 2:
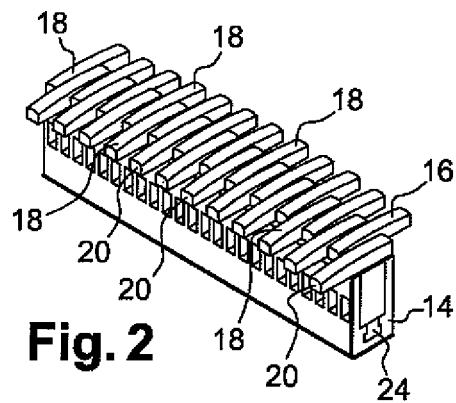
FIG. 2 is a perspective view of an element according to an embodiment of the invention for shaping a circumferential portion of a raw tire blank.
Figure 3:
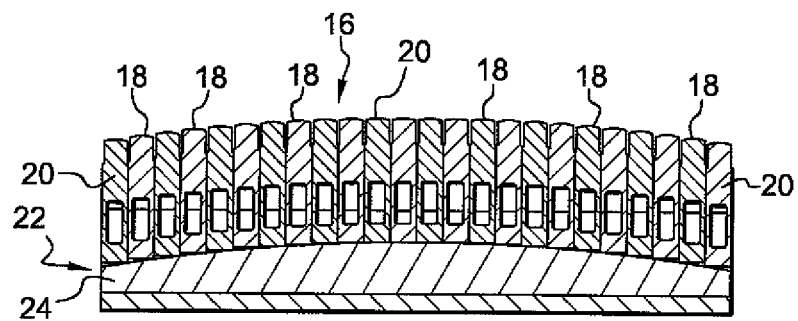
FIG. 3 is a view in cross section of the element of FIG. 2.

FIG. 1 depicts a device according to the invention, denoted by the general reference 10.

The device 10 allows the shaping of a raw tire blank. Such a blank (not depicted) has an overall shape that exhibits symmetry of revolution about a main axis of the blank. The device 10 has an overall shape that exhibits symmetry of revolution about a main axis X. Once the blank has been positioned on the device 10, the main axis X of the device 10 more or less coincides with the main axis of the blank.

The device 10 comprises a plurality of elements 12 for shaping circumferential portions of the raw blank. In this particular instance, the device 10 depicted in FIG. 1 comprises twenty-four elements 12 distributed circumferentially about the main axis X.

Since all the elements 12 are identical, we shall now describe just one element 12 with reference to FIGS. 2 to 6.

The element 12 comprises a framework 14 that forms a support for positioning the element 12 with respect to the blank. The support 14 is connected to movement means (not depicted) for radially moving the element so that the position of the element 12 with respect to the blank can be adjusted. These movement means comprise actuators of the pneumatic or electric type.

The element 12 also comprises a bearing surface 16 for bearing radially against a circumferential portion of a corresponding radially internal surface of the blank. The surface 16 is carried by the support 14 and comprises several axial portions 18 called partial bearing surfaces. The full set of partial bearing surfaces 18 forms the bearing surface 16 of the element 12. The element 12 is designed in such a way that the profile, in a radial plane, called the radial profile, of the bearing surface is modifiable.

The element 12 comprises a plurality of movable members 20 that can move radially independently of one another with respect to the support 14. In this particular instance, the element 12 illustrated in FIGS. 2 and 3 comprises twenty-four members 20. The members 20 are axially juxtaposed in a direction substantially parallel to the axis X.

The bearing surface 16 is able to move radially with respect to the support 14. In the example illustrated, each member 20 carries one of the partial bearing surfaces. The partial bearing surfaces 18 are able to move radially independently of one another.

In addition, the element 12 comprises means 22 for radially positioning the movable members 20 with respect to the support 14, in this particular instance a packing piece 24 depicted separately in FIG. 4. The support 14 comprises means 26 for axially guiding the packing piece 24. In the example depicted, the means 26 comprise a female slide 28 and a male slide 30. The male slide 30 is formed by the packing piece 24 that can be slidably mounted in the female slide 28.

The element 12 also comprises means 32 for radially guiding each movable member 20 with respect to the support 14. The means 32 comprise a female slide 34 formed in the support 14 and a male slide 36 formed by a body 38 of each member 20.

The element 12 additionally comprises means 40 for limiting the radial travel of each movable member 20 in the support 14. The element 12 finally comprises means 42 for elastically returning each movable member 20.

Each member 20 comprises a head 44 secured to the body 38. The head 44 carries the partial bearing surface. Each member 20 is in the overall shape of an L. As may be seen in FIGS. 1 and 2, two successive heads 44 of two members 20 which succeed one another axially are oriented in opposite directions. Two similar heads 44 of two elements 12 that succeed one another circumferentially are therefore oriented in the same circumferential direction so that the said heads 44 of the two elements 12 that succeed one another circumferentially fit in between one another. Further, the body 38 comprises a cavity 46.

Each member 20 also comprises an actuating surface 47 on the opposite side to the partial bearing surface 18.

The means 40 for limiting the radial travel of each movable member 20 comprise a limit stop 48 which is fixed with respect to the support 14 and positioned in the cavity 46. The limit stop 48 comprises a top surface 50 which forms the lower limit of the travel of each member 20 and a bottom surface 52 that forms the upper limit for the travel of each member 20.

The means 42 for elastically returning each movable member 20 comprise a spring 54 fixed to the support 14 and stressed by each movable member 20. Each member 20 is able to move between a rest position, depicted in FIG. 5, and an actuated position, depicted in FIG. 6, in which the packing piece 24 acts upon each movable member 20.

The female slide 28 is delimited firstly by the actuating surface 47 and secondly by a base surface 55 facing the actuating surface 47. The distance between the base surface 55 and the actuating surface 47 can vary as a function of the radial position of each member 20 with respect to the support 14. The packing piece 24 has an actuating surface 56 that complements each actuating surface 47 of each movable member 20. The radial profile of the packing piece 24 defines the radial profile of the bearing surface 16. The packing piece 24 is intended to be inserted between the base surface 55 and the actuating surface 47 of each movable member 20. Thus, the complementary actuating surface 56 has a radial profile that is substantially similar to that of the bearing surface 16 in the actuating position. In this particular instance, the surface 56, in a radial plane of section, exhibits a profile that is curved radially outwards.

The invention is not restricted to the embodiment described hereinabove.

It is also possible to provide means of axially locking the packing piece 24.

In order to modify the radial profile of the radial bearing surface 16, the device 12 could also comprise automatic means for changing the packing piece 24. The device could thus comprise means for moving the packing piece 24 that is to be changed axially by moving a new packing piece into the female slide 28 so that the packing piece 24 that is to be changed is expelled from the slide 28. Thus, the packing piece for each of the elements 12 could be changed by rotating the device 12 about the main axis X by an angle of $2\pi/n$ where n is the number of elements 12, in this instance by 15°, so that the packing piece-change means are successively aligned with the female slide 28 of each element 12.

Furthermore, the actuating surface 56 could have any radial profile: flat, curved radially outwards, curved radially inwards, etc.

The invention claimed is:

1. A device for shaping a raw tire blank, the device exhibiting symmetry of revolution about a main axis, the device comprising several elements being distributed circumferentially about the main axis, each element comprising a bearing surface for bearing radially against a circumferential portion of a radially internal surface of the blank, each element being configured in such a way that a radial profile of the bearing surface is modifiable, wherein each of said elements comprises:
    a support and several movable members that can move radially with respect to the support independently of one another and which are axially juxtaposed, each movable member having a partial bearing surface, the partial bearing surfaces of the movable members together forming the bearing surface of the element; and
    positioning means for radially positioning the movable members with respect to the support, the positioning means comprising a packing piece adapted to be inserted between a base surface of the support and actuating surfaces of the movable members, a radial profile of the packing piece defining the radial profile of the bearing surface of the element, wherein each packing piece is rigid such that it is configured to be capable of axially sliding into place beneath the movable members of the element with which it is used, simultaneously sliding against the actuating surfaces of the movable members of the element in question while overcoming an elastic force which biases each of the movable members of the element in question towards the base of the element in question.

2. The device according to claim 1, wherein for each of said elements, the support of the element in question comprises a channel, and the packing piece used with the element in question comprises a male slide that can be slidably mounted in the channel of the support of the element in question.

3. The device according to claim 1, further comprising means for radially guiding each movable member with respect to its support.

4. The device according to claim 1, further comprising means for limiting the radial travel of each movable member.

5. The device according to claim 1, wherein the radial profile of each packing piece is continuously variable without any linear portion.

* * * * *